United States Patent [19]

Smith et al.

[11] Patent Number: 5,179,758
[45] Date of Patent: Jan. 19, 1993

[54] WIPER ATTACHMENT FOR REAR VIEW MIRRORS

[76] Inventors: Darrel L. Smith, 4012 E. Louisiana Ave.; Donnie Knight, 4014 E. Louisiana Ave., both of, Tampa, Fla. 33610

[21] Appl. No.: 802,316

[22] Filed: Dec. 4, 1991

[51] Int. Cl.⁵ .......................... B60S 1/20; B60S 1/26; B60S 1/44; B60S 1/56
[52] U.S. Cl. .......................... 15/250.003; 15/250.12; 15/250.24; 15/250.29; 318/DIG. 2
[58] Field of Search .............. 359/507, 509; 15/250 B, 15/250 R, 250.24, 250.30, 250.29, 250.12, 250.13; 318/DIG. 2, 443

[56] References Cited

U.S. PATENT DOCUMENTS

| | | | |
|---|---|---|---|
| 1,561,320 | 11/1925 | Glidric et al. | 15/250.29 |
| 2,648,098 | 8/1953 | Kiker, Jr. | 15/250.24 |
| 2,944,276 | 7/1960 | Presser | 15/250.24 |
| 4,037,286 | 7/1977 | Medeavis et al. | 15/250 B |
| 4,271,381 | 6/1981 | Munz et al. | 15/250 B |
| 4,336,482 | 6/1982 | Goertler et al. | 15/250.12 |
| 4,457,597 | 7/1984 | De Gideo | 15/250.29 |
| 4,653,136 | 3/1987 | Denison | 15/250 B |
| 4,672,208 | 6/1987 | Williams | 15/250 B |
| 4,763,381 | 7/1988 | Williams | 15/250.01 |
| 4,873,740 | 10/1989 | Vahrenwald et al. | 15/250 B |
| 4,896,395 | 1/1990 | Bissell | 15/250 B |

OTHER PUBLICATIONS

"Mirror Safety Wiper," Spenco Inc., Cavalier, N.D.

*Primary Examiner*—Philip R. Coe
*Assistant Examiner*—Gary K. Graham
*Attorney, Agent, or Firm*—Peter H. Rehm

[57] ABSTRACT

A rear view mirror wiper accessory to be removably attached to the rear view mirror of a truck, bus, or similar vehicle, characterized by: a low profile vertically oriented armless wiper assembly that wipes from side to side, an electric power control that regularly reverses polarity and can be located in the truck's cab or otherwise away from the accessory, and an assembly of pulleys and a cable that imparts motion to a wiper blade. At each end of the wiper blade's range of travel is a switch that cuts off electric power until the power control changes polarity. The wiper accessory has means to hold it in place during installation and removal so it can be moved from vehicle to vehicle without requiring readjustment of the vehicles' rear view mirror(s). A low cost bidirectional motor and gear train make the accessory economical.

17 Claims, 7 Drawing Sheets

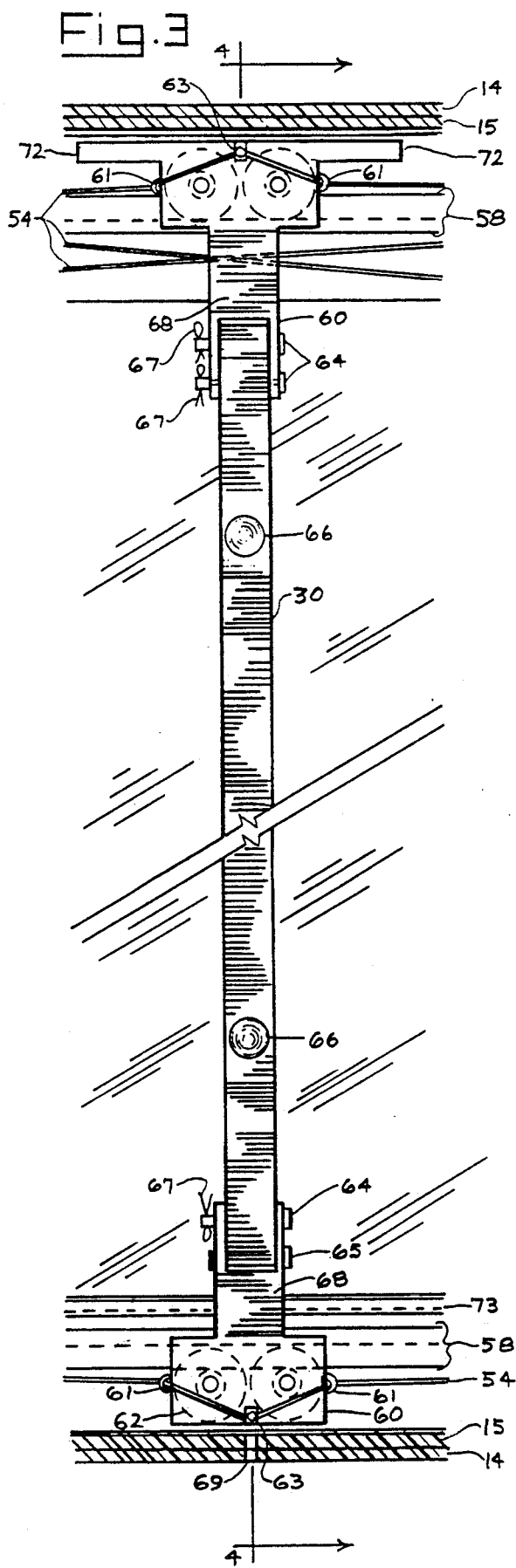
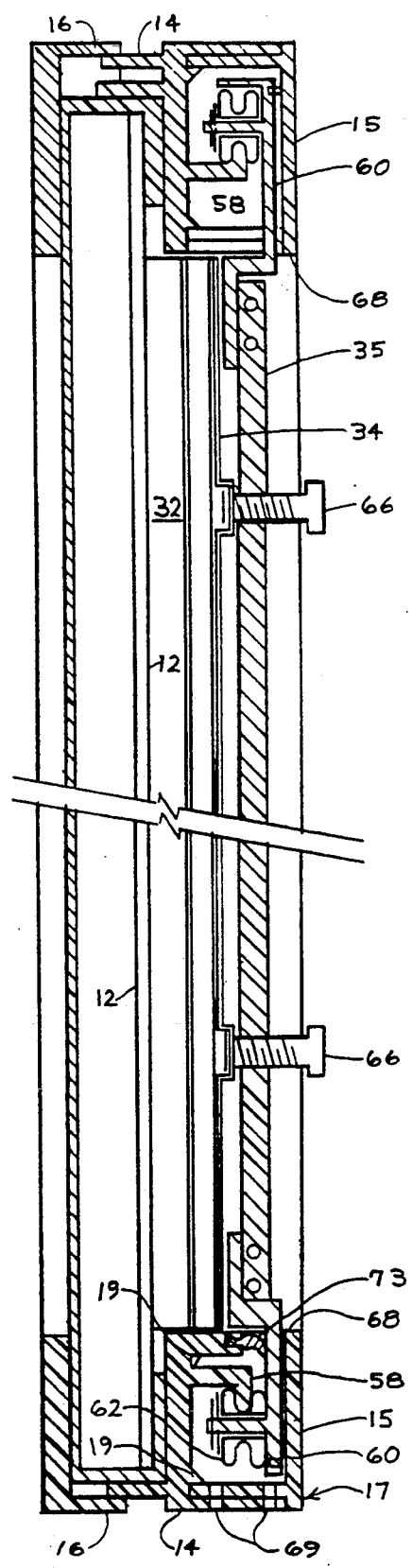

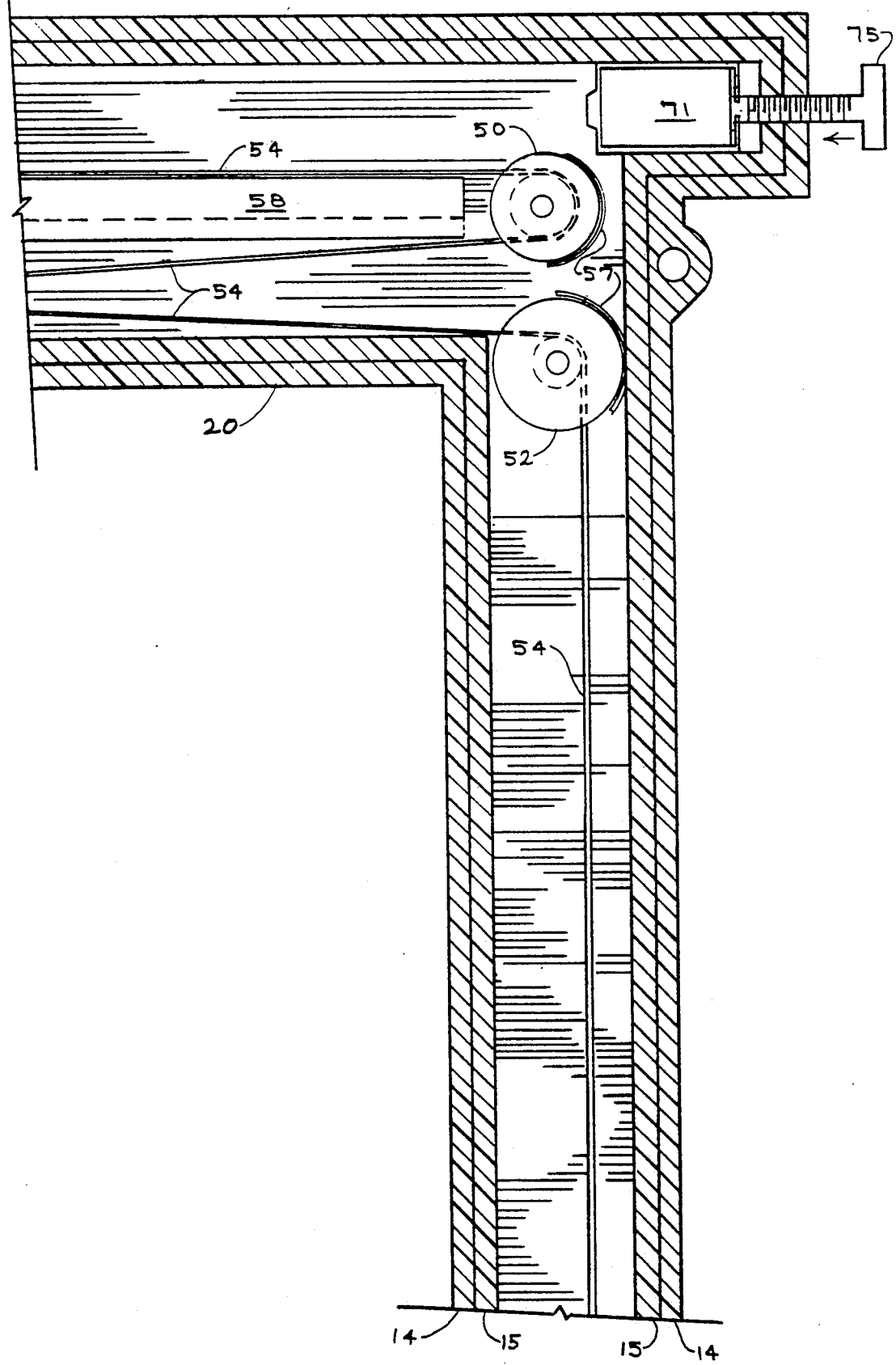

WIPER ATTACHMENT FOR REAR VIEW MIRRORS

BACKGROUND OF THE INVENTION

This invention relates generally to wiping and specifically to wiping of rear view mirrors of vehicles such as trucks, busses, and similar vehicles.

The use of wipers on the rear view mirrors of large commercial vehicles is a potential trend in the industry. Because of their length, it is especially important that trucks and busses have an excellent view of what is beside them. Unfortunately, heavy rainfall can obscure the view in a standard rear view mirror. Even a heated mirror does not help in heavy rainfall. If a dangerous circumstance suddenly presents itself in a vehicle's path, the driver might not be able to tell whether it is safe to change lanes left or right to avoid the danger. Therefore, having clean mirrors can prevent accidents and save lives.

Many patents have issued on various inventions related to wiping of rear view mirrors. Yet it is still a rare sight to see a vehicle equipped with any of these inventions. In the absence of regulations mandating wipers on the external rear view mirrors of large commercial vehicles, the popularoty and commercial success of such wipers can be expected to be highly price sensitive.

Mirror wipers that are easily stolen as well as expensive present additional financial risk to the potential buyer. Some mirror wipers mount in a way that makes them hard to remove without removing the mirror too. If the wiper is stolen the mirror will probably be stolen with it. Such a mounting arrangement risks not only the cost of both these items but also the ability to continue driving safely and legally. Current regulations require that a truck must have all equipment on and working. A driver operating a truck or other commercial vehicle with a missing rear view mirror is risking an accident. He or she is subject to receiving a citation, stiff fine, and possibly additional consequences from his or her employer. Therefore, the driver must replace the stolen mirror before operating the vehicle.

Many drivers do not own the large vehicles they operate. Even if they want to have mirror wipers for their own safety, they are deterred because they would have to purchase them for mounting on someone else's vehicle. This is especially true where drivers regularly move from vehicle to vehicle.

OBJECTS AND SUMMARY OF THE INVENTION

The objects of the invention are to provide a rear view mirror safety wiper that is made from inexpensive parts and is less expensive to produce and thus more affordable than prior art mirrors. Another object is to provide a mirror wiper attachment that is easily moved from vehicle to vehicle, yet which is harder to steal in working order than a mirror wiper that has all major parts outside the vehicle. Another object of the invention is to provide a rear view mirror attachment that can be mounted onto and dismounted from an existing rear view mirror without disturbing the mirror's position.

These and other objects of the invention are fulfilled by providing an exterior rear view mirror wiper accessory having a rectangular frame fitting the rectangular mirrors typically found on large trucks and busses. Inside two opposite side members of the frame are a pair of runner tracks on which a pair of runner assemblies slide. The two runner assemblies hold the ends of a wiper blade and keep it pressed against the mirror. The runner assemblies are also attached to a cable loop. The cable is looped around at least six pulleys in such a way as to make the runner assemblies slide synchronously back and forth. The cable is driven back and forth by an inexpensive motor through a velocity reducing gear train. The motor is powered by an electric power control that regularly changes polarity. The special power control is usually located apart from the mirror, such as in the truck's cab. The wiper accessory has a switch signaling the presence of the wiper at each end of its range of travel. When the wiper actuates one of these switches, it cuts off power to prevent further travel outside the desired range. The accessory also has a two-step mounting system for attaching it to the truck's mirror. A temporary mount attaches easily without applying unbalanced pressure to the mirror. It holds the accessory in place while a long term mount is being secured. If this is done carefully it can be accomplished without moving the mirror. The accessory can therefore be mounted and dismounted without changing the orientation or angle of the mirror's adjusted position.

BRIEF DESCRIPTION OF THE DRAWINGS

FIG. 2 is a back view of the wiper accessory.

FIG. 3 is a detailed sectional front view of the runner assemblies as attached to the frame and the wiper assembly.

FIG. 4 is a sectional side view of the wiper assembly taken along the line 4—4 in FIG. 3.

FIG. 5 is a detailed sectional view of the upper right hand corner of the wiper accessory.

DESCRIPTION OF THE PREFERRED EMBODIMENTS

Figure 1:
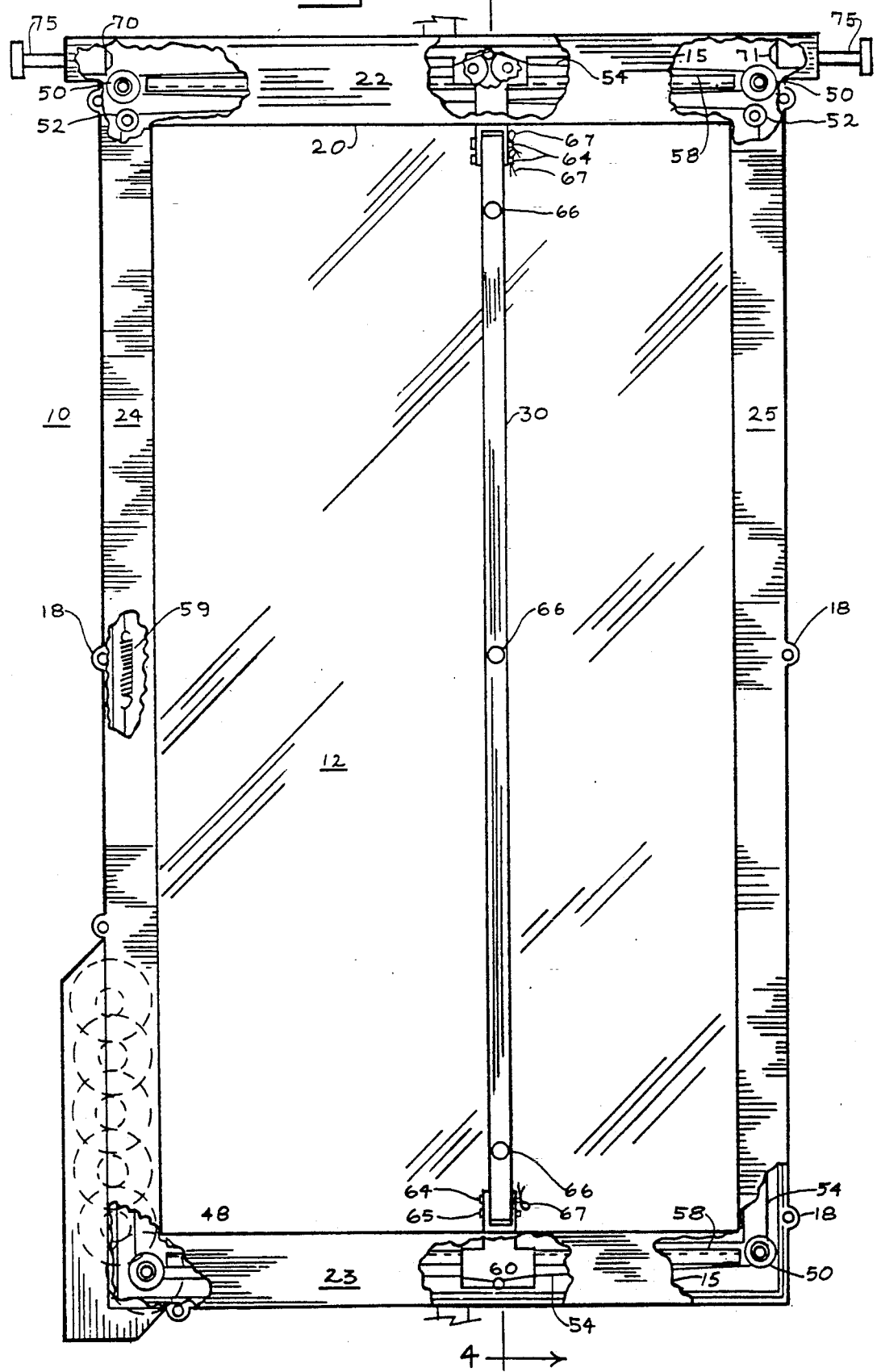
FIG. 1 is a front view of the wiper accessory of the current invention mounted on a rear view mirror.

Reference is made to FIG. 1 showing the wiper accessory 10 mounted on a typical truck or bus rear view mirror 12. The type of mirror shown is also known as a side view mirror or west coast mirror. The mirror 12 remains mounted directly to the vehicle during installation and use of the accessory 10. The accessory 10 has a frame 14 with a front cover 15 and back cover 16 (FIG. 2). The front cover 15 does not need to be removed to install the accessory on a mirror 12. The front cover 15 and frame 14 are sealed at their parallel walls 17, which are held together by a rim 19 extending all around the frame 14. The accessory 10 is installed on a mirror 12 by placing the frame 14 on the front of the mirror 12 and the back cover 16 on the back of the mirror 12 and mounting them to each other by screws 18. The frame 14 and back 16 therefore hold the mirror 12 between them. The assembled wiper accessory 10 has a top side member 22, bottom side member 23, left side member 24, and right side member 25.

Figure 6:
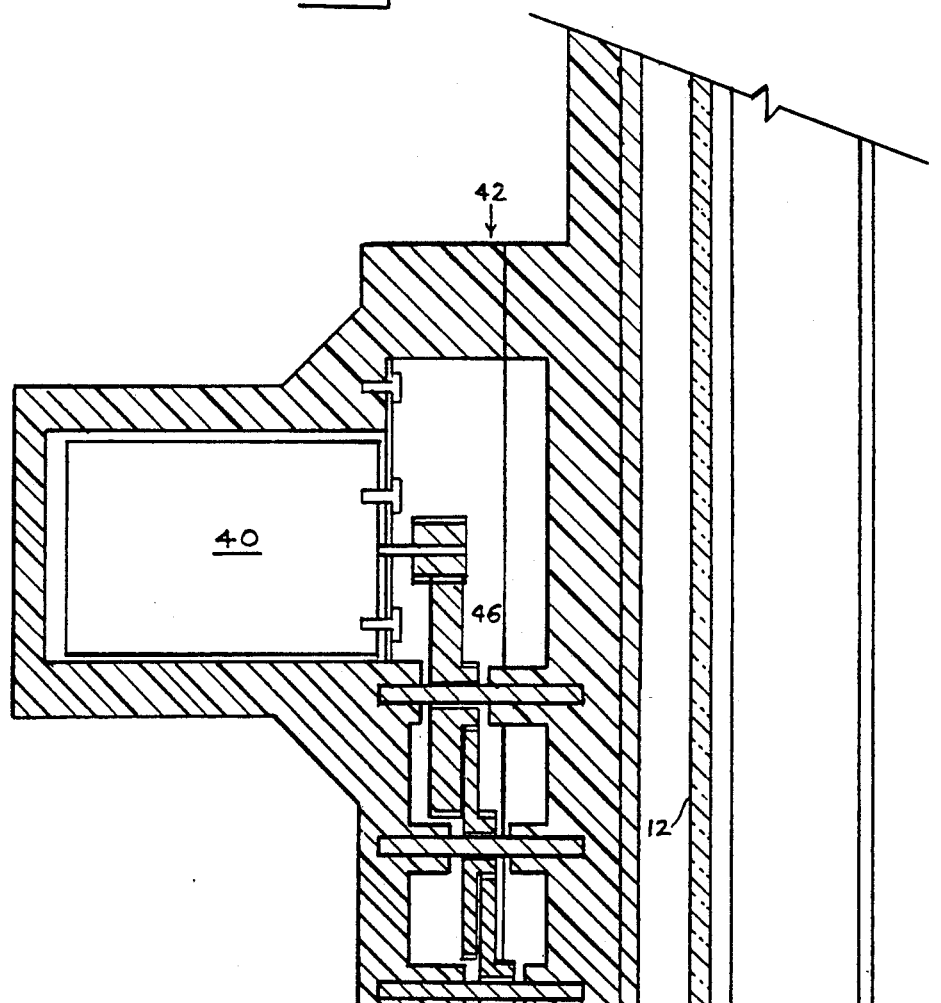
FIG. 6 is a sectional side view of the drive motor, gear train, and drive pulley of the current invention.

Wiping action is achieved by a motor 40, a system of gears 46, six pulleys 48/50/52 and a cable 54. As shown in FIG. 6, the motor 40 and a weatherproof gear box 42 are located behind the mirror. The gears 46 in gear box 42 reduce the rotational velocity of the motor 40 from high speed at the motor 40 to much slower at the drive pulley 48. The accompanying increase in torque allows a common, inexpensive, and relatively weak (but fast) DC motor to drive the wiper. The cable can be wrapped around the drive pulley 48 to increase its grip through friction. The drive pulley 48 is removably coupled to gear train 46 by a square peg 49 and socket 51.

Figure 7:
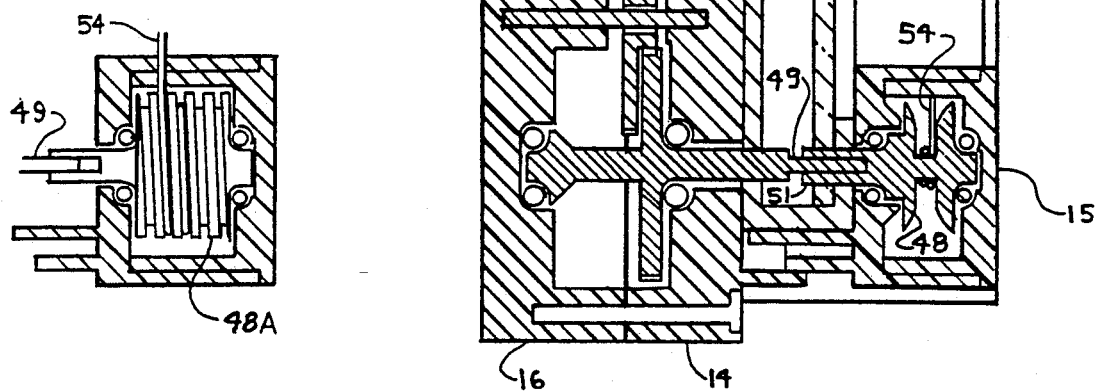
FIGS. 7 and 8 are respectively first and second alternatives to the drive pulley shown in FIG. 6.
Figure 8:
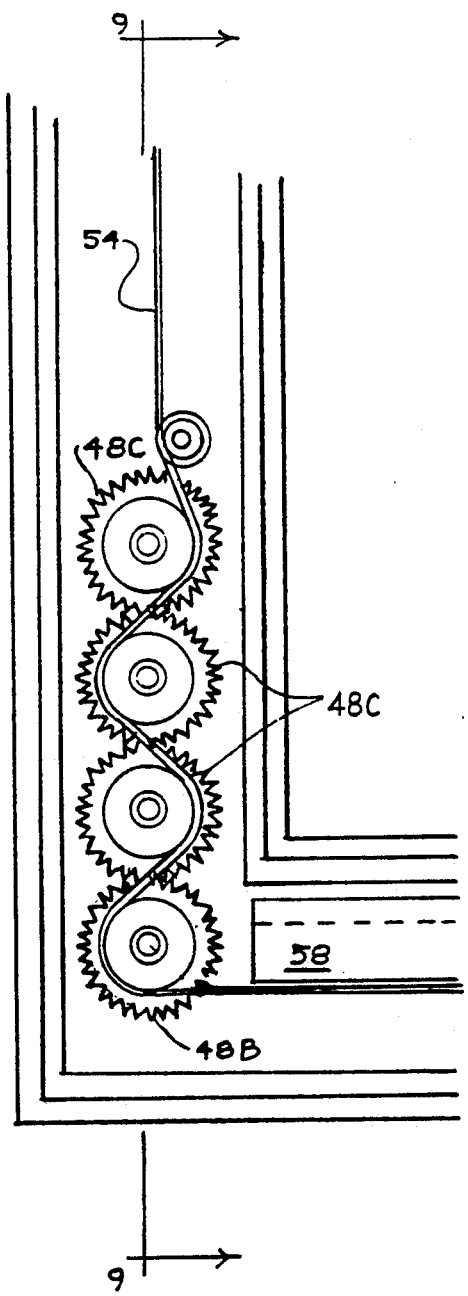
Figure 9:
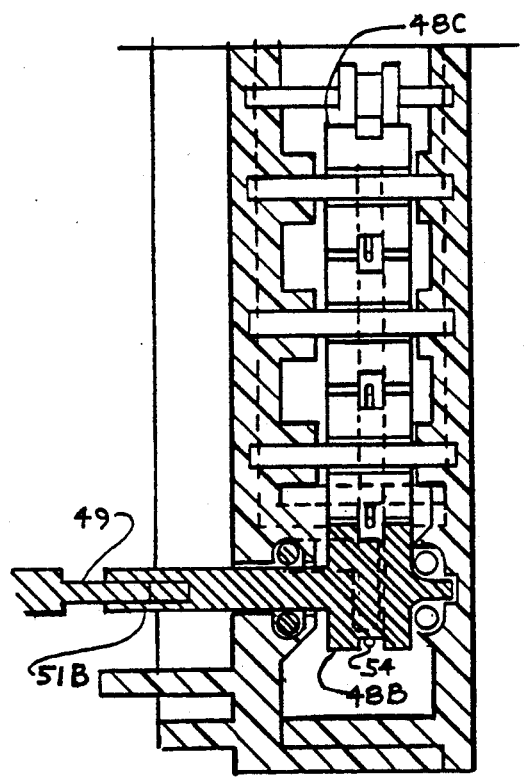
FIG. 9 is a sectional view taken along the line 9—9 in FIG. 8.

FIG. 7 shows a first alternative drive pulley 48A that may be used instead of drive pulley 48. The screw shaped slot of the alternative drive pulley 48A guides the cable 54 and helps prevent tangles. FIGS. 8 and 9 show two views of a second alternative drive pulley arrangement. A direct drive pulley with spur gear 48B has a square socket 51B by which it is connected to square peg 49 on the slow side of the gear train 46. This spur gear 48B also drives several follower spur gear drive pulleys 48B/48C. The multiple drive pulleys 48B/48C contribute to the friction or grip on cable 54 without compromising its ability to slip when necessary to prevent damage. The drive mechanism of FIGS. 8 and 9 is flatter than the screw shaped slotted drive pulley 48A of FIG. 7 and provides enough friction without tangles. The drive pulley 48A of FIG. 7 is most preferred.

An elongated flexible member such as a cable 54 is strung among the pulleys as shown. The cable 54 is urged to move back and forth along its length synchronously with the rotation of drive pulley 48. The means of urging can be any of the mechanisms shown in FIGS. 6-9. It also can be one or more pulleys that are not at a corner.

The cable 54 is threaded around six pulleys 48/50/52 as best shown in FIG. 1. The four corner pulleys 48/50 align the cable with the runner tracks 58 and are therefore also called runner pulleys 48/50. Each runner track 58 has a pair of runner pulleys 48/50 associated with it, one runner pulley at each opposite end of the runner track 58. The portion of the cable 54 between each pair of runner pulleys 48/50 is kept substantially parallel to the associated runner track 58. However, between the two pairs of runner pulleys 48/50, the cable 54 crosses itself so the two runner assemblies 60 travel synchronously back and forth. The remaining two pulleys 52 cause the cable 54 to cross outside the mirror's 12 field of view. The exact position of these additional pulleys 52 is not critical, but to prevent the cable from rubbing itself at the crossover point the four pulleys in the top side member should not all lie in the same plane. Preferably, one of the additional pulleys is slightly above and one is slightly below the plane defined by the four runner pulleys.

The groove in each pulley 48/50/52 is deep enough to contain the cable 54. Each pulley 48/50/52 also has a curved guard 57 (FIG. 5) to prevent the cable 54 from popping out. The cable is kept under tension by some means such as a tension arm or spring. Preferably, for a vertical wiper assembly, this is a tension regulating spring 59 that interrupts the cable at a point that doesn't ever encounter a pulley, as shown in FIG. 1. (No such point exists for a horizontal wiper assembly, so it would be necessary to have a pulley on a spring loaded tension arm bear against the cable.) Some tension is essential for the drive pulley 48 to grip the cable 54.

A pair of oppositely facing runner assemblies 60 serve as mounts for the wiper assembly 30. They slide or roll along runner tracks 58 with the movements of the cable 54, taking the wiper blade with them. Their position relative to one another keeps the wiper assembly 30 parallel to the sides of the mirror 12. For a rectangular mirror they are directly opposite one another. Each runner assembly 60 has a pair of flanged wheels 62 that ride on a runner track 58 to reduce friction and increase stability. The cable 54 is threaded through hooks or loops 61 on the outside of each side of the runner assembly 60, close to the runner track 58. The cable 54 is guided around the runner assembly 60 along a path that keeps it clear of the flanged wheels 62. A clamping screw 63 locks the cable in place so it does not slip relative to the runner assembly 60.

The part of the runner assembly 60 having the flanged wheels 62 is located deep inside a space between the frame 14 and the front cover 15. This space is protected from water by a strip of flexible weather stripping 73. One edge of the weather stripping 73 is permanently mounted to the frame 14 and the opposite edge presses against the front piece 15. The runner assemblies 60 have a thin, flat area 68 between the flanged wheels 62 and the connection to the wiper assembly 30. This flat area 68 passes between the flexible weather stripping 73 and the front piece 15 with minimal leaks. The bottom of the bottom side member 23 has drainage holes 69 for draining any water that does leak through. The weather stripping 73 is flexible and durable enough to allow the runner assembly 60 to slide back and forth repeatedly.

The wiper assembly 30 is attached to the runner assemblies 60 by a few removable pins 64 and a rivet 65 at the very bottom. When all pins 64 are removed, the wiper assembly pivots around the rivet 65. This provides access to the flexible wiper blade 32 or squeegee and its rigid backing 34 so they can be removed and replaced. The pins 64 are held in place by cotter pins 67 or the like. The wiper assembly 30 is pressed against the mirror 12 and held at a suitable angle by the four flanged wheels 62 of the runner assemblies 60.

West coast mirrors are commonly recessed relative to a protective metal frame or boarder around the mirror. Because the wiper accessory must be adaptable to the various thicknesses of common west coast mirrors, the blade depth can be adjusted by several depth adjustment screws 66 that are spaced along the wiper assembly 30. These depth adjustment screws determine the gap between two rigid backings of the wiper assembly, the rigid backing 34 directly attached to the squeegee and the second backing 35 mounted on the runner assemblies 60. The standard depth is half an inch. The whole wiper assembly should be narrow and low enough in profile to be unobtrusive to the driver's view.

The advantage of having the wiper assembly 30 mounted vertically, as shown, is that gravity will cause rainwater to run down the length of the squeegee. The water automatically gets out of the way. Optionally, at the bottom of the wiper assembly 30 is a water runoff guide (not shown) that guides the water away from small gaps in the weather stripping 73 that must necessarily form to each side of the flat part 68 of the runner assemblies 60. The invention could also be provided with a horizontal squeegee that moves up and down. However, in heavy rainfall, large amounts of water can build up on the top portion of an front of the squeegee. Turbulent air flow or wind can drive the upward-bound squeegee. Some excess water may spill over the spilled water against the mirror just under the squeegee, where it may again obscure the driver's view.

The wiper motor 40 is a bidirectional direct current motor. It is powered by a direct current electric power control that periodically changes polarity. Each change in polarity causes a change in the direction of the wiper's motion and begins a new half cycle. Every other change in polarity begins a new cycle. The driver controls the duration of time between half cycles with a multi-position frequency control 92.

The wiper travels between two opposing extreme positions along the mirror. A pair of normally-closed momentary switches 70/71 are located in the frame 14 so that one of these switches 70/71 is actuated when the wiper 30 reaches each end of its desired range of travel. Actuating each switch 70/71 opens the circuit that powers the motor's rotation in one direction only. This causes the wiper 30 to stop until the beginning of the next half cycle when the polarity of electricity to the motor 40 is reversed. If each half cycle is of short duration, the switches 70/71 will normally not be reached during continuous operation. Nevertheless, they serve as a safety catch that protects the gears 46 and other parts of the invention. As the power control is set to longer durations (lower frequencies) each switch 70/71 will be actuated once per full cycle and the wiping will become intermittent. Thus the presence of the wiper at each of two opposing extreme positions along said mirror is signaled and further travel in that direction is stopped. Every half cycle the wiper's position is automatically synchronized with the power control.

The upper runner assembly 60 has two switch actuating surfaces 72. These surfaces 72 are shaped and positioned to touch the switches 70/71 to actuate them at the proper positions of the wiper. In addition, the location of each switch 70/71 is adjustable by turning sweep-width screws 75, as best shown in FIG. 5. This enables the user to adapt the accessory 10 to side view mirrors of various widths.

Figure 10:
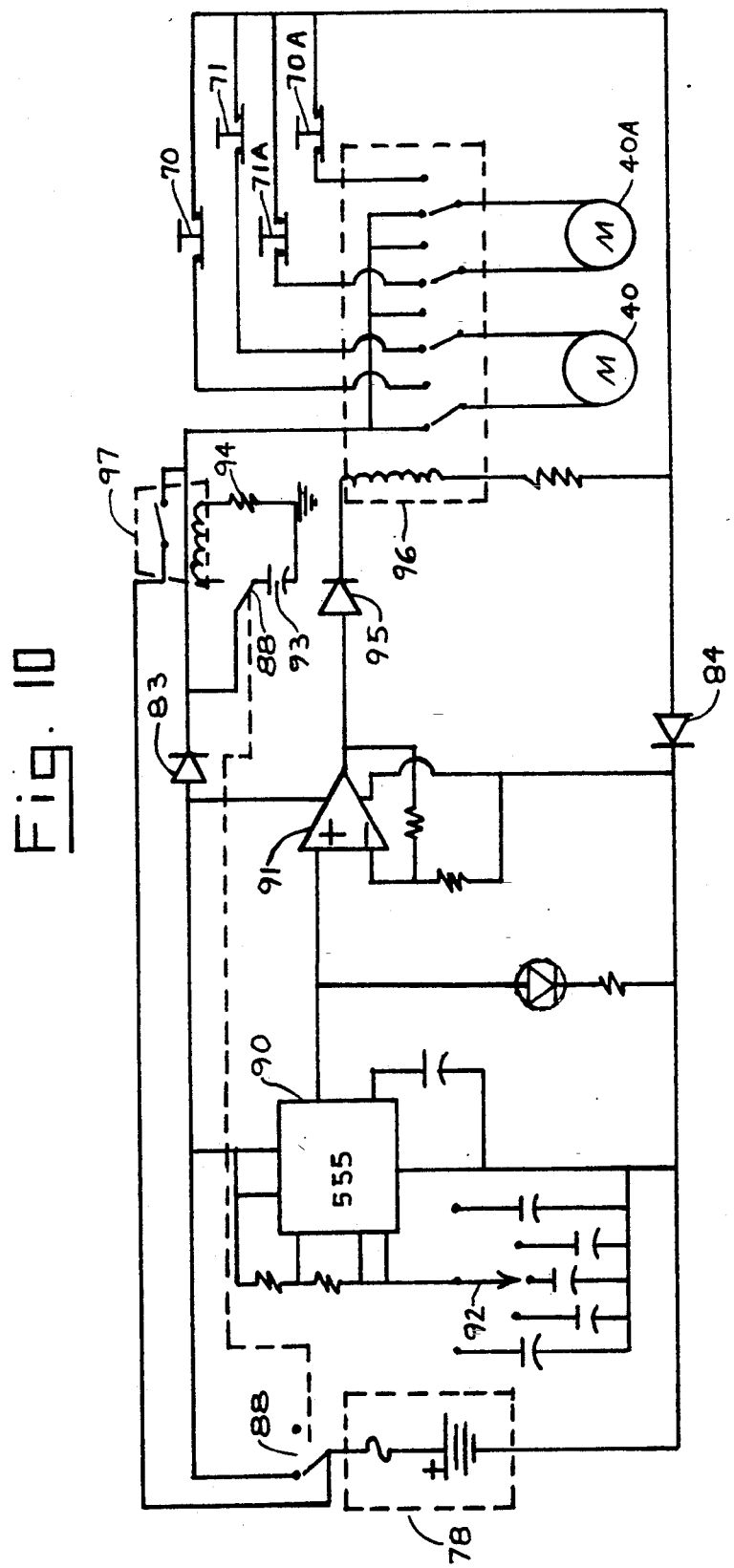
FIG. 10 is an electrical schematic of the power control for the wiper accessory.

FIG. 10 is an electric schematic diagram of the preferred embodiment of the power control 80. The power control 80 is essential to the invention because it participates in the control of the wiper. The power control 80 obtains its power from a fused vehicle power source 78, typically twelve volts. As shown, it can supply power to and control up to two wiper accessories 10, but one wiper accessory 10 is sufficient to practice the invention. The heart of the power control 80 is an oscillator circuit 90. This oscillator circuit 90 must have or preferably be amplified to have sufficient output to actuate the coil of the wiper direction relay 96. The industry standard "555" timer integrated circuit 90 followed by an operational amplifier 91 are shown, but any other oscillator capable of driving the relay 96 at the right frequency would due as well. The "555" timer 90 is hooked up in its self-triggering astable mode. The frequency of oscillation is controlled by the control switch 92, which selects one of several different capacitors. The selected capacitor and two nearby resistors establish a time constant upon which the frequency of oscillation is based. The output of the operational amplifier 91 has two states, one actuates the wiper direction relay 96 and the other state does not. The output of the operational amplifier 91 is rectified by a diode 94 to block any current during the non-actuating state.

The switching contacts of the wiper direction relay 96 are used like one or two double pole double throw (DPDT) switches, depending on whether one or two wiper accessories are being powered. The DPDT relay contacts are wired to supply power to the motor in either normal or reverse polarity depending on whether the relay 96 is actuated. Normally-closed momentary switches 70 and 71 in FIG. 10 interrupt the power when the wiper reaches preset points near the left side member 24 and right side member 25, respectively. Switches 70A and 71A do the same for a second wiper accessory, if installed.

The driver turns the wiper accessory on or off with DPDT power switch 88. When the unit is on, power is supplied to the motor(s) through diode 83 and returned through diode 84. The diodes 83 and 84 also protects the oscillator/amplifier circuit from spikes caused by the motors and relays during normal operation. They should have a peak inverse voltage of several hundreds of volts, depending on the spike voltages actually generated. Capacitor 93 is kept in a charged state while the unit is on.

The wiper accessory may be turned off at any time, with the wiper blade at any position. When the DPDT power switch 88 is turned off, the fully charged capacitor 93 is connected into a tank circuit with the coil of relay 97 and an internal coil resistance and external resistance 94. Relay 97 is also called the off-state parking relay 97. A decaying or oscillating current appears in the circuit and actuates parking relay 97 for a short time after the power is turned off. The actuated parking relay 97 applies a bypass power to the motor(s) through the wiper direction relay 96. A diode 83 prevents this bypass power from reaching the oscillator circuit or actuating the wiper direction relay 96. This assures the bypass power always reaches the motor(s) in the same predetermined polarity, regardless of the polarity at the moment the power switch 88 was turned off. The bypass power immediately causes the wiper blade to return to a predetermined parking position. When the wiper arrives, it is stopped by switch 71. (The optional second wiper is stopped independently by switch 71A). About one and a half seconds of bypass power is adequate for a typical motor. Therefore, capacitor 91 should be fairly large. In one test, 3300 microfarads worked with a total resistance of 550 ohms and a parking relay 97 that required 20 milliamperes to actuate.

An important feature of the invention is that the wiper motor power control 80 can be located a distance from the wiper accessory 10. The power control 80 can be located anywhere on the vehicle and connected to each wiper accessory 10 by as few as five electric wires: two for the motor 40, one for each momentary switch 70/71, and one common to both momentary switches 70/71. If convenience in moving the accessory 10 from vehicle to vehicle is important, then the power control 80 can be plugged into the vehicle's cigarette lighter. On the other hand, if security is more important, the power control 80 can be mounted hidden in a hard to reach place in the cab or under the hood. Without the special power control, the wiper accessory is useless. This increases the time and effort (and therefore risk) required to steal the wiper accessory 10 in working order and discourages such theft to all who know this fact.

On the top side member of the accessory, on the inside surface 20 is a non-slip (high friction or tacky) surface that prevents the frame 14 from slipping off the mirror during installation. This non-slip surface 20 can be any one of various substances or structures such as rubber, silicone, double sided adhesive tape, or anything else that prevents slipping while the mounting screws 18 are being tightened or removed.

It is preferred that gear trains be used with the motor(s), but various other means of reducing the rotational velocity and increasing torque of motors are well known. Many of these could substitute for the gear train(s) with substantially equal results. To keep motor costs down, velocity reduction means external to the motors are preferred over low speed motors.

The wiper accessory 10 is designed to be adaptable to variations in rear view mirrors 12. However, some rear view mirrors, such as those with a teardrop shaped profile as viewed from the top, are so different as to require a special model of the wiper accessory. A special model would differ merely in such things as the length or depth of the side members, the spaces between them, and other dimensions, but the novel structures of the current invention and how they cooperate would remain essentially the same.

The foregoing description is given by way of illustration and example. In light of this teaching, many variations and modifications will become apparent to those familiar with the art without departing from the scope and spirit of the invention. Therefore, it is intended that the scope of this invention not be limited by the foregoing description but rather by the claims appended hereto.

We claim:

1. An exterior rear view mirror wiper accessory adapted for use with an exterior rear view mirror on a large commercial vehicle such as a truck, bus, or similar vehicle, said wiper accessory comprising:
   (a) a frame, said frame having top, bottom, left, and right side members, a centrally disposed substantially rectangular opening for exposing the mirror to view, mounting means for mounting said frame on an existing rear view mirror of said vehicle, and a pair of runner tracks, one of said runner tracks being located in each of two opposite side members and said pair of runner tracks being parallel;
   (b) a pair of runner assemblies, one said runner assembly slidably attached to each said runner track;
   (c) a wiper assembly, said wiper assembly including a flexible wiper blade or squeegee for wiping said mirror and backing means for delivering substantially even pressure along said flexible wiper blade against said mirror, said flexible wiper blade being attached to said backing means and said backing means having two opposite ends, and each said opposite end of said backing means being mounted to one of said runner assemblies;
   (d) a plurality of pulleys and a cable threaded around said pulleys, said cable being attached to said runner assemblies for constraining said runner assemblies to move synchronously back and forth along said runner tracks according to said cable's movements;
   (e) a bidirectional motor;
   (f) drive pulley means for urging said cable to move responsive to said bidirectional motor;
   (g) power source means for applying electric power to said bidirectional motor;
   (h) power control means for periodically reversing the polarity of said electric power applied to said bidirectional motor; and
   (i) detection means for detecting the presence of said wiper assembly at each of two opposing extreme positions along said mirror and for stopping further travel of said wiper assembly beyond said opposing extreme positions by removing electric power from said bidirectional motor until the polarity of said electric power is reversed.

2. The accessory of claim 1 wherein said detection means comprises a pair of normally-closed momentary switches and further wherein each of said switches is capable of removing the electric power to said motor in one polarity only.

3. The accessory of claim 2 additionally comprising a sweep-width adjustment screw connected to each of said momentary switches and said frame for determining the location of said momentary switches and thereby determining the locations of the two opposing extreme positions.

4. The accessory of claim 1 wherein said means for applying electric power to said bidirectional motor and said power control means comprises: an electronic oscillator having at least first and second output states, a relay having a coil and a plurality of electrical contacts, said coil being operationally connected to the output of said oscillator, said first output state being sufficient to actuate said relay and said second output state not actuating said relay, and said contacts being wired to apply normal or reversed polarity electric power to said wiper motor depending on whether said relay is actuated.

5. The accessory of claim 1 additionally comprising parking means, activated when said accessory is switched off, for applying electric power in a predetermined polarity to said bidirectional motor for a duration sufficient to cause said wiper assembly to travel to and park itself at a predetermined location.

6. The accessory of claim 5 wherein said parking means comprises parking relay means and tank circuit means including a capacitor and the coil of said parking relay, wherein during normal operation said capacitor is charged and when power is switched off said capacitor is connected to the coil of said parking relay to complete said tank circuit and said parking relay is actuated for a sufficient time for said wiper accessory to travel to a predetermined parking position.

7. The accessory of claim 1 wherein said backing means includes two substantially parallel narrow strips of rigid material extending the length of said flexible wiper blade, a gap between said two strips of rigid material, and a plurality of depth adjustment screws, said depth adjustment screws spaced along said strips of rigid material and adjustably determining said gap between said two strips of rigid material.

8. The accessory of claim 1 additionally comprising a non-slip surface disposed on the inside surface of said top side member of said frame.

9. The accessory of claim 1 wherein said wiper assembly is substantially vertical.

10. The accessory of claim 1 additionally comprising at least five wires, wherein said power control means is locatable within the cab of said vehicle and connectable to said wiper accessory by said wires, said wires connecting said bidirectional motor and said detecting means with said power control means.

11. The accessory of claim 1 additionally comprising tension means for applying a tension to said cable and wherein said drive pulley means urges said cable only by friction so said cable can slip on said drive pulley when necessary to prevent damage to said wiper accessory.

12. The accessory of claim 1 additionally comprising easily engaging temporary holding means for engaging said frame to the rear view mirror and holding said frame in place while said mounting means is being worked to fully secure said frame to said mirror, all without disturbing said mirror's orientation.

13. The accessory of claim 12 wherein said easily engaging temporary holding means is a non-slip surface disposed on the bottom part of the top side member of said frame, whereby said non-slip surface contacts the top of said mirror during installation and use.

14. The accessory of claim 12 wherein said mounting means comprises a plurality of screws and a back, said back including top, bottom, left, and right sides fitting said side members of said frame, and wherein said frame sits on the front of the mirror and said back sits behind the mirror and said frame and said back are mounted together by said screws and hold the mirror between them.

15. The accessory of claim 1 wherein said drive pulley means includes a drive pulley and said cable is wrapped around said drive pulley a sufficient number of times for said drive pulley to grip said cable during normal operation to yet allow said cable to slip when necessary to prevent damage to said wiper accessory.

16. The accessory of claim 1 wherein said drive pulley means includes a drive pulley and a screw shaped slot disposed around the circumference of said drive pulley and wherein said cable is wrapped around said drive pulley and rides in said screw shaped slot.

17. The accessory of claim 1 wherein said drive pulley means includes a direct drive pulley operationally connected to said bidirectional motor, a spur gear on said direct drive pulley, and a plurality of follower spur gear drive pulleys operationally cascaded from said direct drive pulley, and further wherein said cable is threaded back and forth among a sufficient number of said drive pulleys for said drive pulleys to grip said cable during normal operation yet allow said cable to slip when necessary to prevent damage to said wiper accessory.

* * * * *